(12) United States Patent
Hansaki et al.

(10) Patent No.: US 8,194,285 B2
(45) Date of Patent: Jun. 5, 2012

(54) IMAGE PROCESSING APPARATUS AND IMAGE PROCESSING METHOD

(75) Inventors: Tomoyuki Hansaki, Kawasaki (JP); Takatoshi Ota, Yokohama (JP); Hiroaki Sugiura, Yokohama (JP); Koji Ito, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 12/414,493

(22) Filed: Mar. 30, 2009

(65) Prior Publication Data

US 2009/0244631 A1    Oct. 1, 2009

(30) Foreign Application Priority Data

Mar. 31, 2008    (JP) ................. 2008-091559

(51) Int. Cl.
- *H04N 1/40* (2006.01)
- *G06K 15/10* (2006.01)
- *G06K 9/00* (2006.01)

(52) U.S. Cl. .......... 358/3.03; 358/1.9; 358/1.8; 382/251

(58) Field of Classification Search ................. 358/3.03, 358/1.9, 1.8; 382/251
See application file for complete search history.

(56) References Cited

U.S. PATENT DOCUMENTS

| | | | |
|---|---|---|---|
| 5,949,965 A | 9/1999 | Gondek | |
| 6,183,055 B1 * | 2/2001 | Kanematsu et al. | 347/9 |
| 6,342,950 B1 * | 1/2002 | Tabata et al. | 358/1.6 |
| 6,511,143 B1 | 1/2003 | Ishikawa | |
| 7,466,454 B2 * | 12/2008 | Minamino | 358/3.03 |
| 7,660,017 B2 * | 2/2010 | Karito | 358/3.14 |
| 7,872,778 B2 * | 1/2011 | Kazama et al. | 358/400 |
| 2003/0025749 A1 | 2/2003 | Krouss | |
| 2004/0218200 A1 * | 11/2004 | Ebihara | 358/1.9 |

FOREIGN PATENT DOCUMENTS

EP        960739 A2    12/1999

* cited by examiner

*Primary Examiner* — Charlotte M Baker

(74) *Attorney, Agent, or Firm* — Canon USA Inc IP Division

(57) ABSTRACT

An image processing apparatus configured to generate recording data used in an image forming processing for carrying out an image formation by performing a recording scan by plural times on a same image region on a recording medium, includes a division unit for dividing input image data into image data for each recording scan, a quantization unit for quantizing, based on the divided image data for each recording scan, the image data for each recording scan, and a generation unit for generating, based on the quantized image data for each recording scan, recording data for each recording scan, in which the division unit divides the input image data into the image data for each recording scan based on a division rate periodically varying in accordance with a spatial position of an image represented by the input image data.

13 Claims, 16 Drawing Sheets

| VALUE | DOT ARRANGEMENT |
|---|---|
| 0 | □ |
| 1 | ▨ |
| 2 | ▨ |

IMAGE PROCESSING APPARATUS AND IMAGE PROCESSING METHOD

BACKGROUND OF THE INVENTION

1. Field of the Invention

The present invention relates to an image forming apparatus and an image processing method.

2. Description of the Related Art

An inkjet printer has been proposed as an example of an image forming apparatus configured to carry out an image formation by performing recording scan by plural times on the same image region on a recording medium.

In the inkjet printer, a recording head is reciprocated in a main scanning direction, and while a recording medium is conveyed in a sub scanning direction, ink droplets are ejected from a recording head to be impacted on the recording medium for printing an image. In the inkjet printer, depending on errors due to physical factors for printing the image such as errors in features of the respective nozzles and the sheet conveyance amount and deviations in the recording head distance, fluctuations in the direction and the size of the ink droplets, the impact positions, and the like are generated. In a printing operation based on one-time recording scan, the fluctuations directly cause density unevenness and streaks appearing on the print image, which is a cause of degrading the quality of the image.

In view of the above, as a measure for suppressing the generation of such density unevenness and streaks, a multi-pass recording method has been proposed. According to this technology, by combining an image processing with a print control, it is possible to form an image at a high speed while suppressing the decrease in the image quality due to the density unevenness and the streaks.

Hereinafter, the multi-pass recording method will be described in detail with reference to FIG. 12.

In FIG. 12, a recording head 5101 is composed of eight nozzles 5102 for simplifying the description. Ink droplets 5103 are ejected by the nozzles 5102. Typically, in a case where the main scan recording region in a predetermined recording medium is completed by the one-time recording scan, it is ideal that the ink is ejected in a uniform direction with a uniform ejection amount as shown in FIG. 12.

However, as described above, due to the physical factors at the timing of printing, in the printing operation based on the one-time recording scan, the fluctuations in the direction and the size of the ink droplets ejected from the respective nozzles are generated. As a result, in the head main scanning direction, a white background part periodically exists, and on the other hand, dots are overlapped with each other beyond necessity. The congregation of the dots impacted in such a state is sensed as the density unevenness in an array direction of the nozzles. Also, when a misalignment is generated between the recording scans, a joint part between the recording scans is sensed as the streak.

In view of the above, according to the multi-pass recording method, as shown in FIG. 13, the recording scan is performed by the recording head 5201 by plural times (in this example, three times). In the drawing, a recording region in units of four pixels which is the half of eight pixels in the vertical direction is completed by performing the recording scan by two times. In this case, the eight nozzles 5202 in the recording head 5201 are divided into groups of four nozzles on the upper side (upper side nozzle group) and four nozzles on the lower side (lower side nozzle group). The dots recorded by one nozzle in one-time recording scan are obtained by thinning-out the image data by about half in accordance with a predetermined image data array. Then, by embedding about half dots which are the remaining dots at the second scan into the previously formed image, the recording of the four pixel unit region is completed.

Also, according to the two-pass recording method, the first recording scan and the second recording scan mutually complement in accordance with the predetermined array. As an image data array used for this operation (thinning-out mask pattern), in usual cases, such an array is employed as shown in FIG. 14 that a houndstooth check pattern is formed for one pixel each in vertical and horizontal directions. Therefore, in the unit recording region (in this example, the four pixel unit), the print is completed through the recording scan for the first time to print a houndstooth check and the recording scan for the second time to print a reverse houndstooth check. The upper, middle, and lower stages of FIG. 14 respectively illustrate a state where the record is gradually completed in the same region by using the above-described houndstooth check pattern and the reverse houndstooth check pattern. That is, first, as shown in the upper stage of FIG. 14, the recording of the houndstooth check pattern (black circle) is performed on the predetermined region on the recording medium by using the four nozzles on the lower side at the first recording scan. Next, as shown in the middle stage of FIG. 14, at the second recording scan on the relevant region, the paper feed is performed by the four pixels, and the record of the reverse houndstooth check pattern (white circle) is performed by using all the eight nozzles. Furthermore, as shown in the lower stage of FIG. 14, at the third recording scan on the relevant region, the paper feed is performed by the four pixels again, and the houndstooth check pattern is recorded by using the four nozzles on the upper side.

When the multi-pass recording method is carried out, even in a case where the multi-head having the fluctuations shown in FIG. 13 is used, the influence on the recording medium caused by the fluctuations is suppressed by half. Also, when the misalignment between the recording scans is generated, the influence is suppressed by half. For this reason, the density unevenness in the image to be formed is suppressed. Herein, the example in which the printing is completed by performing the recording scans by two times. In general, if the number of the recording scans is increased, the influence caused by the fluctuations or the misalignment can be suppressed. Thus, it is possible to suppress the density unevenness in proportion the number of the recording scans. On the other hand, the printing time is increased in accordance with the number of the recording scans.

For this reason, in a case where the number of the recording scans is desired to be decreased for performing a printing at a high speed, it is difficult to average the fluctuations in the ink droplets and the misalignment between the passes. As compared with the case where the number of the recording scans is not reduced, the density unevenness becomes conspicuous. Therefore, in order to improve the image quality even in the printing with the small number of the recording scans, an appropriate dot arrangement having a feature resistant to the fluctuations in the ink droplets and the misalignment between the passes (hardly decreasing the image quality) should be prepared.

In view of the above, a technology is proposed for creating recording data through thinning-out by using a thinning-out pattern without regularity utilizing random numbers or the like when the recording data corresponding to the respective recording scans is created from the print data. For example, in a case where the printing is performed by performing the recording scan by two times, the thinning-out is performed by using the thinning-out pattern without regularity utilizing the random numbers at the first recording scan, and the thinning-out is performed by using a thinning-out pattern which is obtained by reversing the above-described thinning-out pattern at the second recording scan, thus creating the recording data. As a result, the regularity disappears in the dot configuration as compared with the printing based on the conventional recording scan performed by two times in a related art, and the image quality is improved. However, also as described above, the fluctuations in the ink droplets and the misalignment between the recording scans are generated. As the complementary relation is established by performing the thinning-out by using the mask pattern between the respective recording scans, if the fluctuations in the ink droplets and the misalignment between the recording scans are caused, overlapped dots and periodic white background parts are formed, which tend to be sensed as the density unevenness. In particular, the misalignment between the recording scans interferes the dot pattern, and the density unevenness and the streaks appear as inappropriate patterns over the entire scan.

Therefore, it is necessary to prevent the dot pattern from interfering any dot patterns created in the print data of the respective recording scans in a case where the misalignment between the recording scans is generated. However, it is difficult to obtain a mask pattern which prevents the interference of the dot patterns for any input images.

In view of the above, to cope with such a problem, a technology is proposed for distributing the respective pixel values of the relevant image data the stage of the multi-value image data for each recording scan through a method of dividing the pixel values at a constant ratio or a method of dividing the pixel values while randomly changing a rate. Furthermore, quantization is performed on the respectively distributed multi-value data, and the image corresponding to the recording scan with the restrained complementary relation is generated. Through these processings, the degree of dependence in the change of the image density with respect to the fluctuations in the ink droplets and the misalignment between the passes is decreased, and the image quality is improved.

However, in a case where the image corresponding to the respective recording scans is generated through the above-described method, as shown in FIG. 15, in some cases, the dot arrangement is disproportionate between the passes, and the dots are overlapped with each other. For this reason, the streaks and the unevenness are sensed on the print image due to the dot arrangement between the recording scans in some cases. In a case where the pixel values of the multi-value image data are distributed at a constant ratio, depending on the dot arrangement created as a result, the dot patterns of the respective pass images are interfered between the recording scans, which tends to be sensed as the streaks and the unevenness on the print image. On the other hand, in a case where the pixel values are distributed at a random rate, a local density change is caused when the misalignment is generated between the passes at the time of the printing, which tends to be sensed as the unevenness. In order to further improve the image quality, the fluctuations in the ink droplets, a method of suppressing the interference of the dot patterns and the density change when the misalignment is generated in particular between the passes is demanded.

SUMMARY OF THE INVENTION

The present invention has been made in view of the above-described problem, and the invention provides an image processing apparatus and an image processing method with which a density unevenness of an image formed through a multi-pass recording method is suppressed.

The present invention has the following configuration.

According to an aspect of the present invention, there is provided an image processing apparatus configured to generate recording data used in an image forming processing for carrying out an image formation by performing a recording scan by plural times on a same image region on a recording medium, the image processing apparatus including: a division unit configured to divide input image data into image data for each of the recording scans; a quantization unit configured to quantize, based on the divided image data for each of the recording scans, the image data for each of the recording scans; and a generation unit configured to generate, based on the quantized image data for each of the recording scans, recording data for each of the recording scans, in which the division unit divides the input image data into the image data for each of the recording scans based on a division rate periodically varying in accordance with a spatial position of an image represented by the input image data.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. It is noted that configurations according to embodiments to be described below are merely examples, and the present invention is not limited to the illustrated configurations.

According to the present embodiment, an example will be described in which an inkjet printer is applied as a printer. Also, a case will be described as an example in which printing is carried out by performing a recording scan by two times as a multi-pass method.

Figure 1:
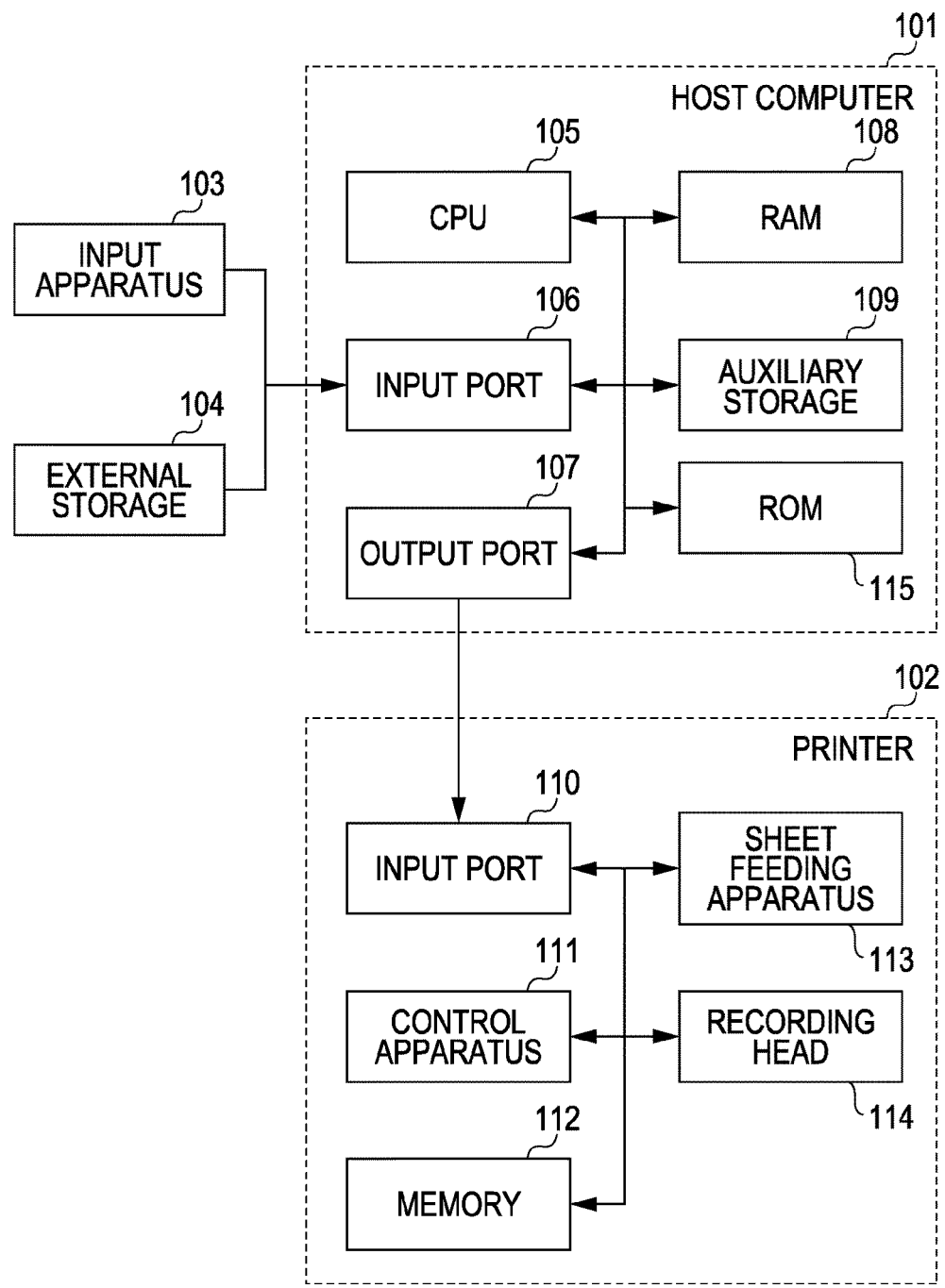
FIG. 1 is a block diagram of a configuration example of a print system according to a first exemplary embodiment of the present invention.

FIG. 1 is a block diagram of a configuration example of a print system according to a first exemplary embodiment of the present invention. The print system of FIG. 1 includes a host computer 101, a printer 102, an input apparatus 103, and an external storage 104. In the host computer 101, a CPU 105 controls operations of the entire host computer 101 while following programs are stored in a RAM 108 and a ROM 115. The RAM 108 is used as a main memory of the CPU 105, and a program executed by the CPU 105 is loaded onto the RAM 108. Also, the RAM 108 provides a work area for temporarily saving various pieces of data when the control operation is performed by the CPU 105. The ROM 115 stores a boot program and various pieces of data in a non-volatile manner. Also, the host computer 101 includes an input port 106 and an output port 107 such as a LAN and a USB port, the RAM 108, and an auxiliary storage 109. In the host computer 101, the input apparatus 103 such as a scanner or a digital camera and the external storage 104 such as a CD-ROM drive or a memory card reader are connected to the input port 106. In the host computer 101, the printer 102 is further connected to the output port 107. Also, the printer 102 includes an input port 110 such as a USB or a LAN for receiving print data and control information, a control apparatus 111 for performing an internal control for the printer, and a memory 112 for holding the print data, internal setting, and the like. Also, the printer 102 includes a sheet feeding apparatus 113 and a recording head 114 provided with a nozzle for ejecting ink to a recording medium.

Figure 2:
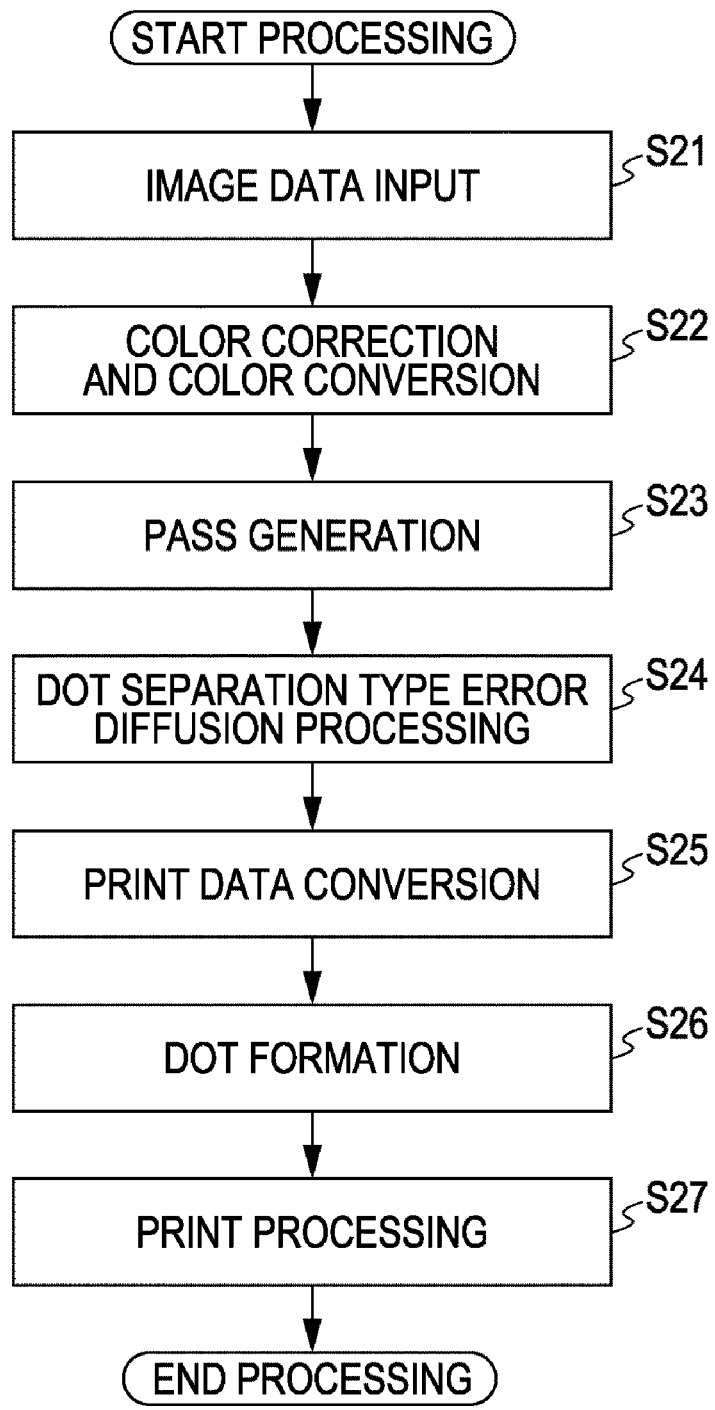
FIG. 2 is a flow chart for describing a processing according to the first exemplary embodiment of the present invention.
Figure 5:
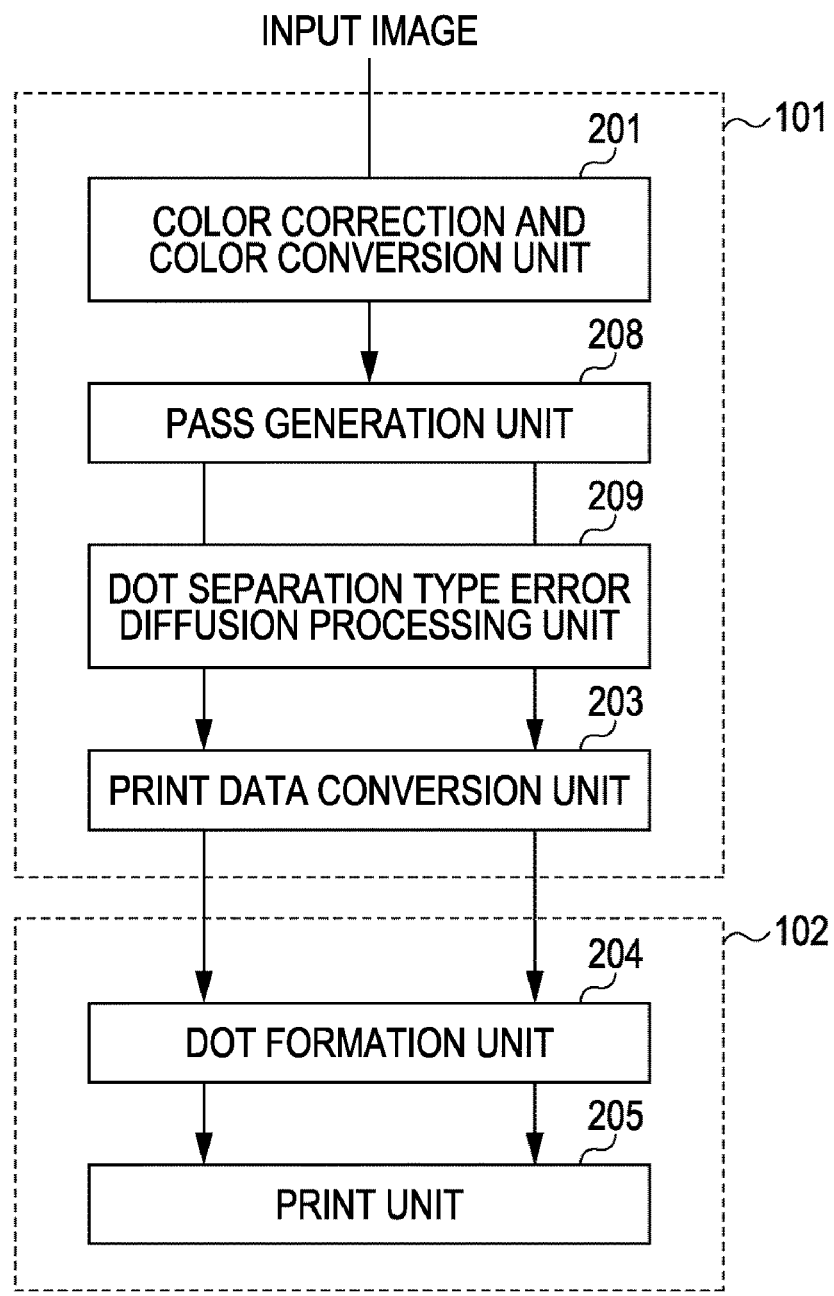
FIG. 5 is an explanatory diagram for describing the respective processing units in a host computer and a printer.

FIG. 2 illustrates a flow of a processing according to the present embodiment. It is noted that steps S21 to S25 represent the processing in the host computer 101. In addition, steps S26 and S27 represent the processing in the printer 102. It is noted that the embodiment is not limited to the above, and steps S21 to S27 may represent the processing in the printer 102. Also, FIG. 5 is an explanatory diagram for describing the respective processing units in the host computer 101 and the printer 102. In FIG. 5, the host computer 101 is provided with a color correction and color conversion unit 201 for performing color correction and color conversion on the input image and a pass generation unit 208 for generating a pass image. Also, the host computer is provided with a dot separation type error diffusion processing unit 209 for performing the quantization on the respective passes and a print data conversion unit 203 for performing a conversion into the print data. Then, the printer 102 is provided with a dot formation unit 204 for performing a dot formation processing so that the respective quantized pass images correspond to the dots and a print unit 205 for performing a print on the recording medium.

Hereinafter, a description will be provided of the flow of the processing according to the present embodiment with reference to FIG. 2. First, an image desired to be printed is input to the host computer 101 by using the input apparatus 103 or the like (S21). Next, the input color or gray scale image is transferred to the color correction and color conversion unit 201 of FIG. 5. In the color correction and color conversion unit 201, the color correction is performed in accordance with the print setting, and RGB components which are generally used for the image data are converted into CMYK components which are suitable for the printing in the printer (S22). After that, the respective color components are independently processed in general, and thus a description will be provided of the processing for one color.

Figure 6:
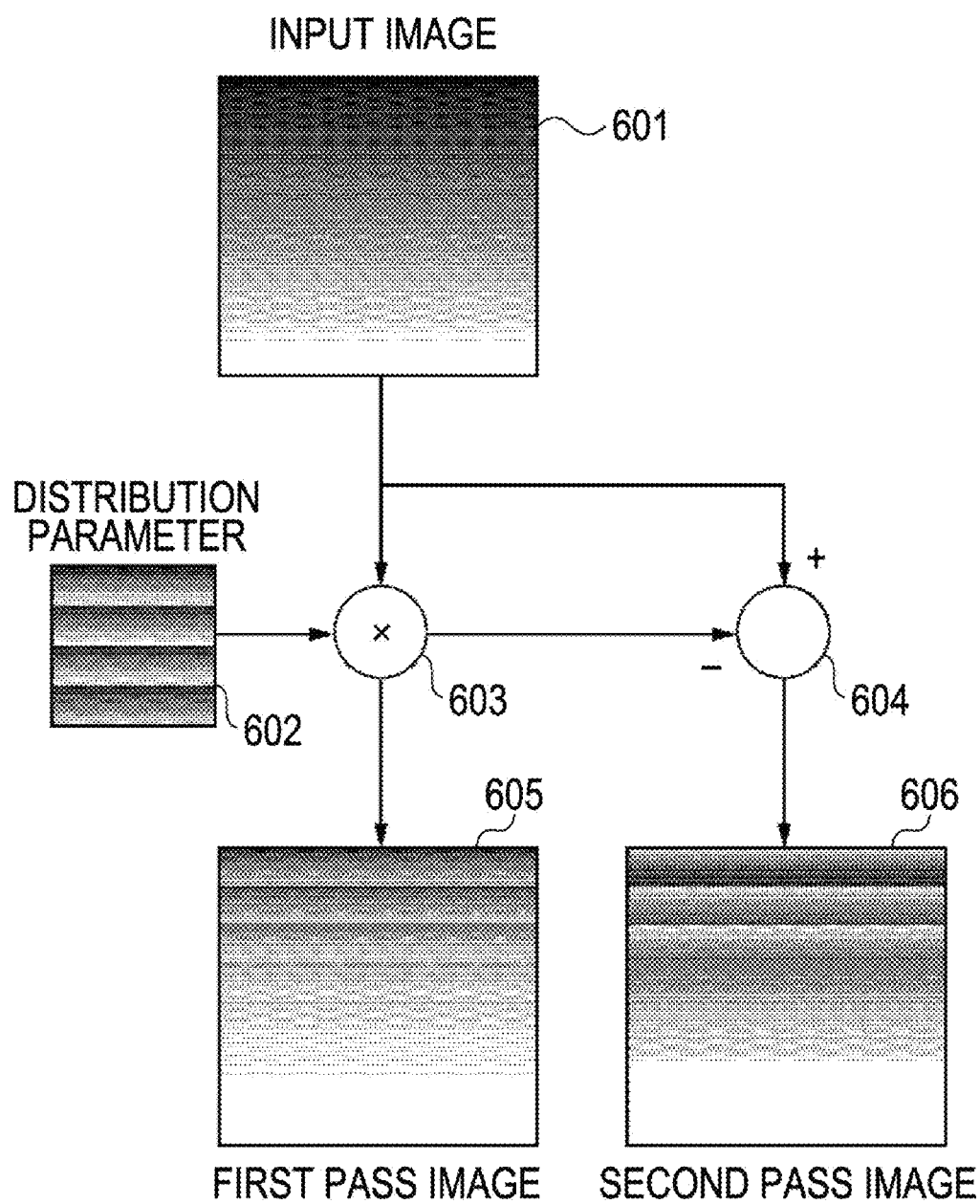
FIG. 6 is an explanatory diagram for describing a processing for pass generation.
Figure 7:
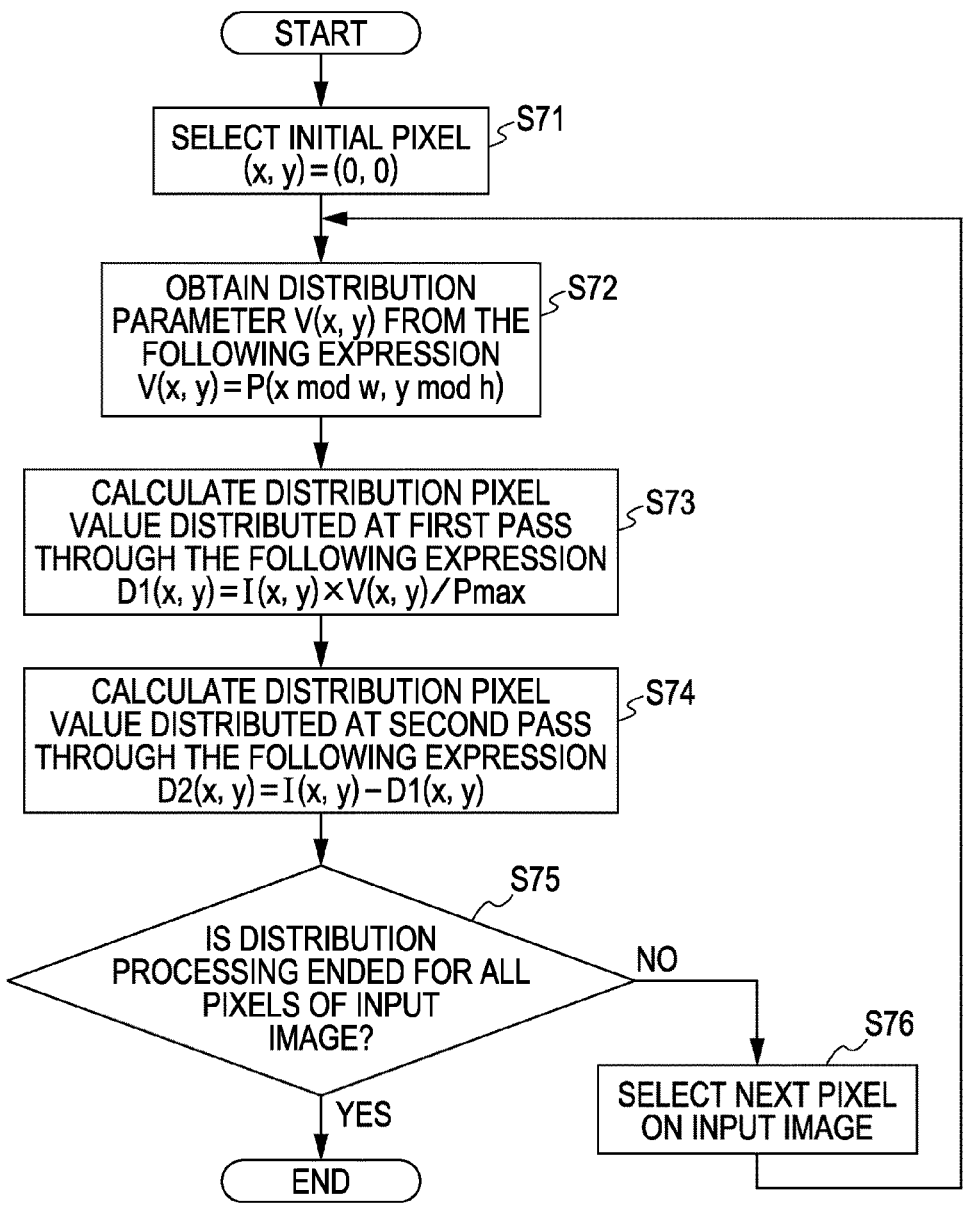
FIG. 7 is a flow chart for describing the processing for the pass generation in detail.

For the image converted into the CMYK components, pass generation is performed in the pass generation unit 208 of FIG. 5 (S23). Herein, the pass generation is equivalent to the generation of the image data for each of the recording scans in the multi-pass method. FIG. 6 is an explanatory diagram for describing a processing for the pass generation processing. FIG. 6 illustrates an input image 601 whose pass generation is to be performed, a distribution parameter 602 for deciding a distribution rate of the pixel values for the respective passes, a multiplier 603, and an adder 604. Also, a first pass image 605 and a second pass image 606 exist as outputs. The pass generation according to the present embodiment uses external parameters in which a ratio for distributing the pixel values to the respective passes is set like the distribution parameter 602. Also, FIG. 7 is a flow chart for describing the processing for the pass generation in step S23 of FIG. 2 in detail. Hereinafter, a detailed description will be provided of the pass generation in FIG. 7 also with reference to FIG. 6.

First, as an initial processing, a pixel at a position (0, 0) of the input image 601 is selected (S71). Next, among pixels on the distribution parameter 602, a parameter (density value) at the same position as the selected pixel is obtained (S72). It is noted that in a case where the size of the distribution parameter is smaller than the input image, it is regarded as being arranged in a tile manner, and the repetitive use of the distribution parameters is performed in an insufficient direction. Therefore, while a position of the selected pixel on the image is set as (x, y) and the size of a parameter P is set to have a width w and a height h, a parameter V (x, y) to be obtained can be obtained as follows.

$$V(x, y) = P(x \bmod w, y \bmod h)$$

When the parameter is obtained, the pixel value of the selected pixel (input value) I (x, y) is multiplied, as shown in the following expression, by a ratio with respect to a maximum parameter Pmax of the parameter V (x, y) obtained in step S72 to calculate a first pass distribution pixel value D1 (x, y) to be distributed to the first pass image (S73, the multiplier 603).

$$D1(x, y) = I(x, y) * V(x, y) / P\max$$

The calculated first pass distribution pixel value is stored in a first pass image buffer on the RAM of FIG. 1. Furthermore, a second pass distribution pixel value D2 to be distributed to the second pass image is calculated (S74, the adder 604). As shown in the following expression, the first pass distribution pixel value is subtracted from the input value of the selected pixel, and the calculated second pass distribution pixel value D2 is stored in a second pass image buffer on the RAM 108 of FIG. 1.

$$D2(x, y)=I(x, y)D1(x, y)$$

On the basis of the condition of step S75, while the selected pixel is advanced (S76), the pixel is repeated for all the pixels from S72 until S74 to obtain the first pass image 605 and the second pass image 606.

Figure 8:
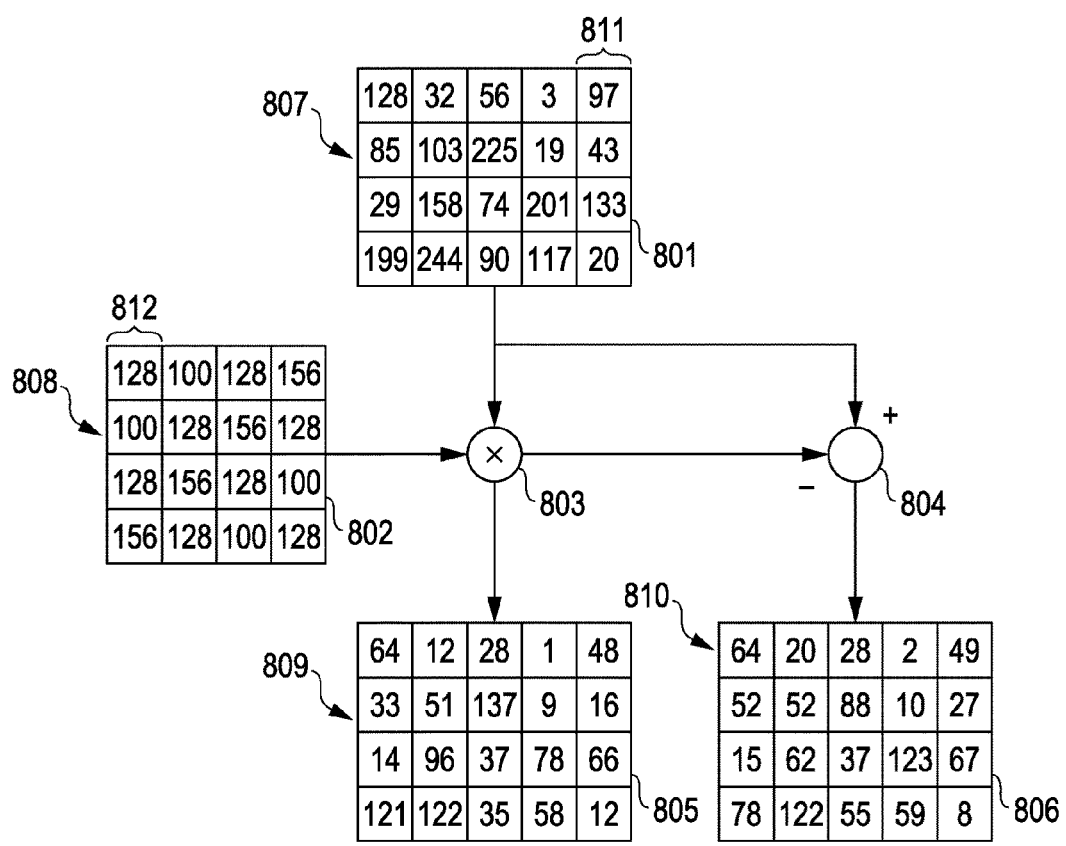
FIG. 8 is an explanatory diagram for specifically describing the processing for the pass generation.

This processing will be hereinafter described by using specific values. FIG. 8 illustrates the processing of FIG. 6 by using the specific values. FIG. 8 illustrates an input image 801, a distribution parameter 802, a multiplier 803, an adder 804, a first pass image 805, and a second pass image 806. The respective values represent the pixel values or parameters. As an example, a description will be provided while a pixel 807 is set as the selected pixel. First, from the positional relation, a parameter 808 of the distribution parameter 802 is used for the pixel 807. Herein, as the maximum value of the parameter is 255, on the basis of I=85, P=100, and Pmax=255, the first pass distribution pixel value of the pixel 807 is D1=33 while omitting the fractions. It is noted that at this time, the fractions is omitted, but fractions over ½ may be counted as one and the rest may be disregarded, or fractions may be counted as one. The first pass distribution pixel value D1 calculated herein corresponds to a pixel 809 of the first pass image 805. Also, the second pass distribution pixel value of the pixel 807 is D2 (810)=52 which is obtained by subtracting D1 from the density of the pixel 807. The similar processing is performed on all the pixels the input image 801 to respectively generate the first pass image and the second pass image. Also, with respect to the input image 801, the fifth column which is not covered by the size of the distribution parameter 802 (a part of a column 811 in the input image 801 and a column at coordinates (4, y)) is regarded as being arranged in a tile manner, and repeatedly used in the insufficient direction, so that V (4, y)=P (4 mod 4, y mod 4)=P (0, y) is established, and the first column is used (it is noted that 0≦y≦4 is established herein). That is, a column 812 of a parameter 802 is used.

It is noted that the distribution parameter is set so as to distribute the pixel values while the spatial and periodical variation is added in a sheet feed direction and a carriage direction. As a method for this variation, the variation in any one of the sheet feed direction or the carriage direction may be used, or the variation in the sheet feed direction and the carriage direction, or two or more directions may be used.

By distributing the pixel value of the input image while the spatial and periodical variation is added, the periodical variation in accordance with the spatial position on the entire pass. As a result, with respect to the inputs to the dot separation type error diffusion processing unit 209 of FIG. 5 to be performed in a subsequent processing, the input values are varied from each other between the passes (between the recording scans). When the images having the same input value are input between the passes, the dot patterns obtained thereafter through the error diffusion processing, the print column data conversion, and the dot formation may be similar to each other between the passes. If the dot patterns are similar to each other between the passes, the dot patterns may interfere with each other between the passes. As described above, when the input values are varied from each other between the passes, the dot patterns between the passes are not similar to each, and an effect is obtained in which the interference of the dot patterns between the passes as the dot patterns similar to each other between the passes are generated is suppressed. Also, an effect is obtained in which the density change is suppressed which is caused when the misalignment between the passes is generated. With these synergetic effects, even when the fluctuation in the ink droplets at the time of the image formation, in particular, the misalignment between the passes is caused, the interference of the dot patterns is suppressed, and the image quality is hardly degraded.

The respective pass images obtained by the pass generation unit 208 of FIG. 5 are transferred to the dot separation type error diffusion processing unit 209 equivalent to the quantization processing unit. It is noted that a processing in the dot separation type error diffusion processing unit 209 to be described below is equivalent to the dot separation type error diffusion processing in step S24 of FIG. 2. A dot separation type error diffusion performed in the dot separation type error diffusion processing unit 209 utilizes a similar method to an error diffusion processing method (dot separation type error diffusion) (for example, Japanese Patent Laid-Open No. 2003-116015) of performing a processing so as not to overlap the dots between cyan and magenta. In the error diffusion processing method (dot separation type error diffusion) according to Japanese Patent Laid-Open No. 2003-116015, the processing is performed so that the dots are not overlapped between the colors (magenta and cyan). According to the present embodiment, the error diffusion processing method (dot separation type error diffusion) is applied between the passes (between the recording scans) instead of being applied between the colors. According to the present embodiment, instead of applying the error diffusion processing method (dot separation type error diffusion) between the colors having different components, it is characteristic that the pixel values having the same component are distributed through the pass generation processing, and the error diffusion processing method is used between the distributed pixel values.

In the dot separation type error diffusion processing unit 209, as a result, the image part corresponding to the low density generates a quantized pass image subjected to the error diffusion processing so that the dots are mutually exclusive. With this processing, the image part corresponding to the low density becomes an exclusive dot arrangement between the passes. It is noted that the pixel value used according to the present embodiment is a value corresponding to the density.

Figure 14:
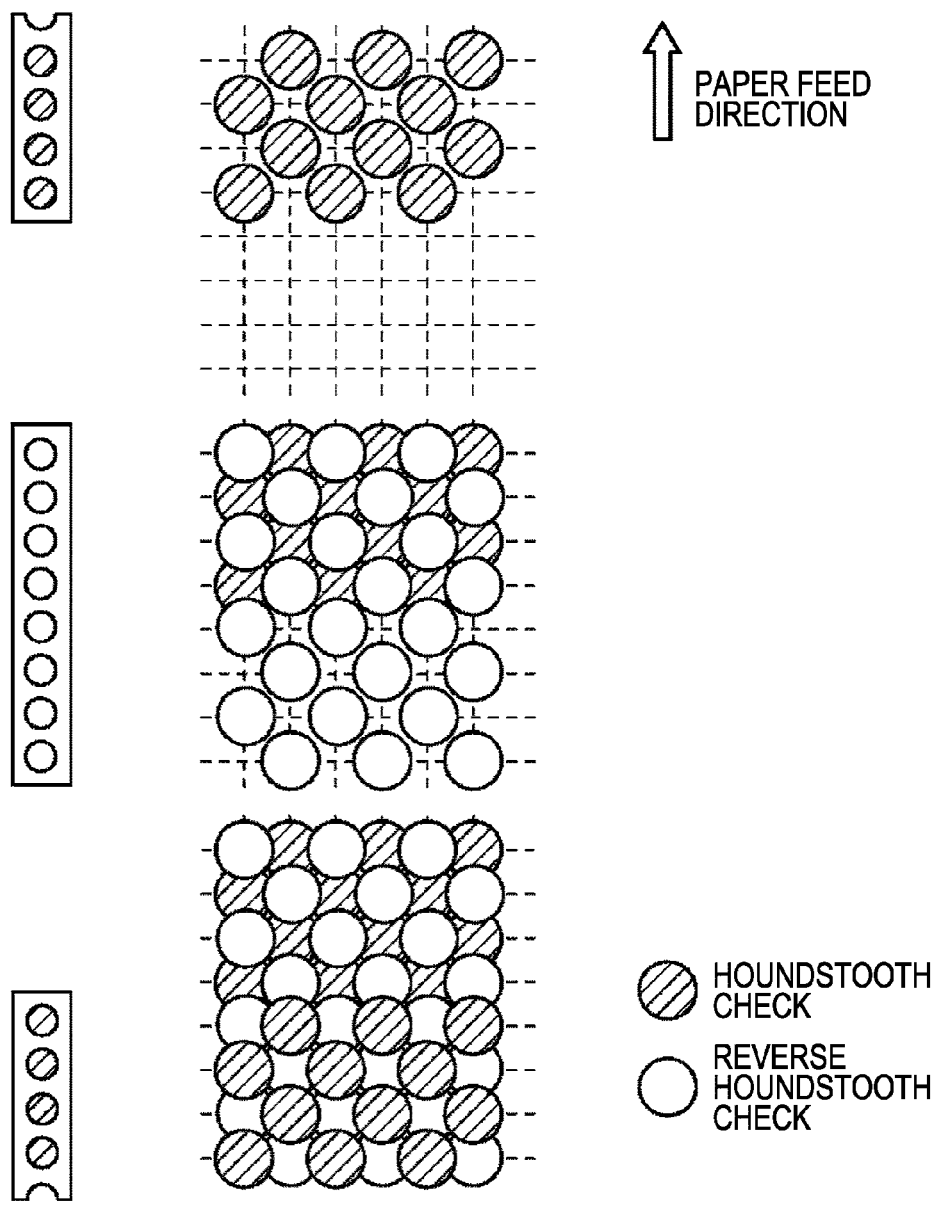
FIG. 14 illustrates states in the upper, middle, and lower stages in which a houndstooth check pattern and a reverse houndstooth check pattern are used to gradually complete the recording on the same region.
Figure 15:
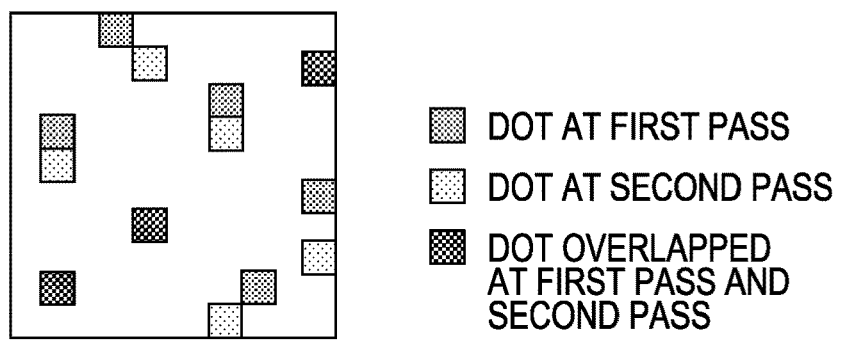
FIG. 15 illustrates a dot arrangement example at a low density part in a case where an error diffusion is independently performed on two passes.
Figure 16:
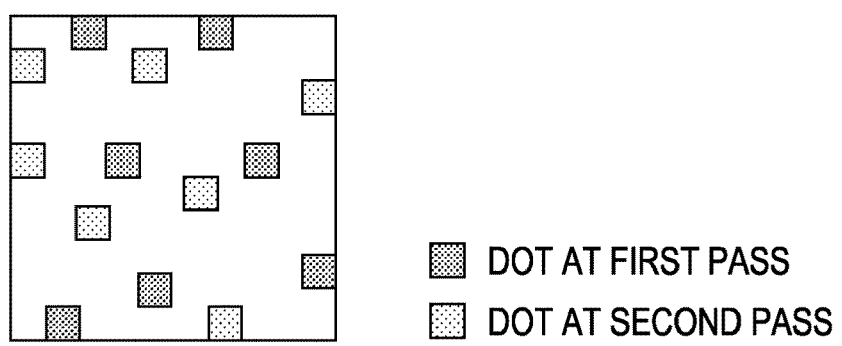
FIG. 16 illustrates a dot arrangement example at a low density part in a case where a dot separation type error diffusion is performed on two passes.

FIG. 14 illustrates a result example when a dot arrangement for two passes performed by the dot separation type error diffusion processing in the dot separation type error diffusion processing unit 209. According to the present embodiment, two pass images are generated from the input image, but it is possible to form the dot patterns equivalent to those obtained when the error diffusion is performed on the single image. Furthermore, the respective dots are appropriately sorted into the respective passes, and a phenomenon is suppressed where degrees of dot density are sparse between the passes. Thus, even when the ink droplets are spread at the time of the printing or the misalignment is generated between the passes, an effect is provided that such a state is hardly sensed as the density unevenness. The method of decomposing such dots to the passes is extremely difficult to realize in a case where a method of decomposition into the passes from the pixel positions fixedly is employed or the quantization between the passes is independently performed as in the related art technology.

Figure 9:
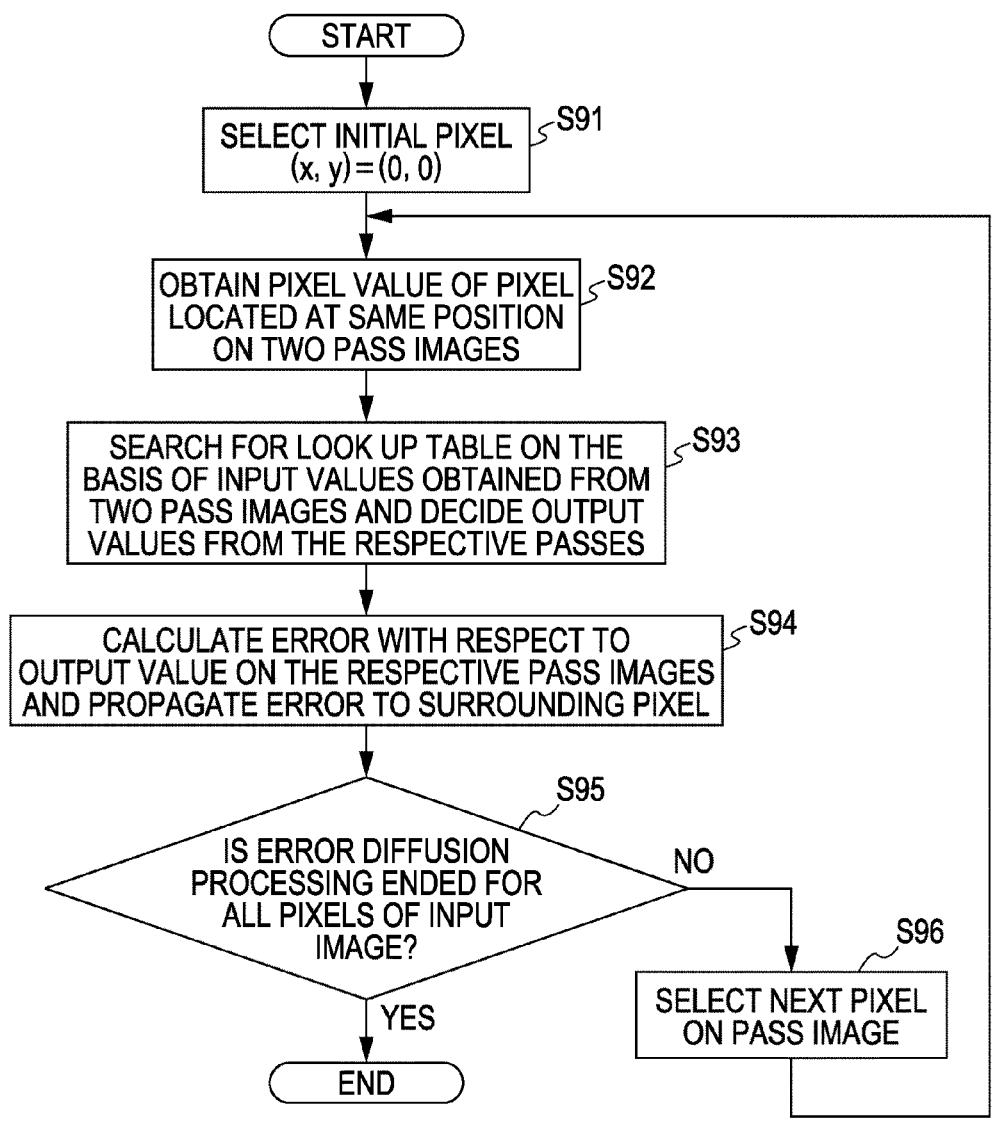
FIG. 9 is a flow chart for describing a dot separation type error diffusion processing in detail.
Figure 10:
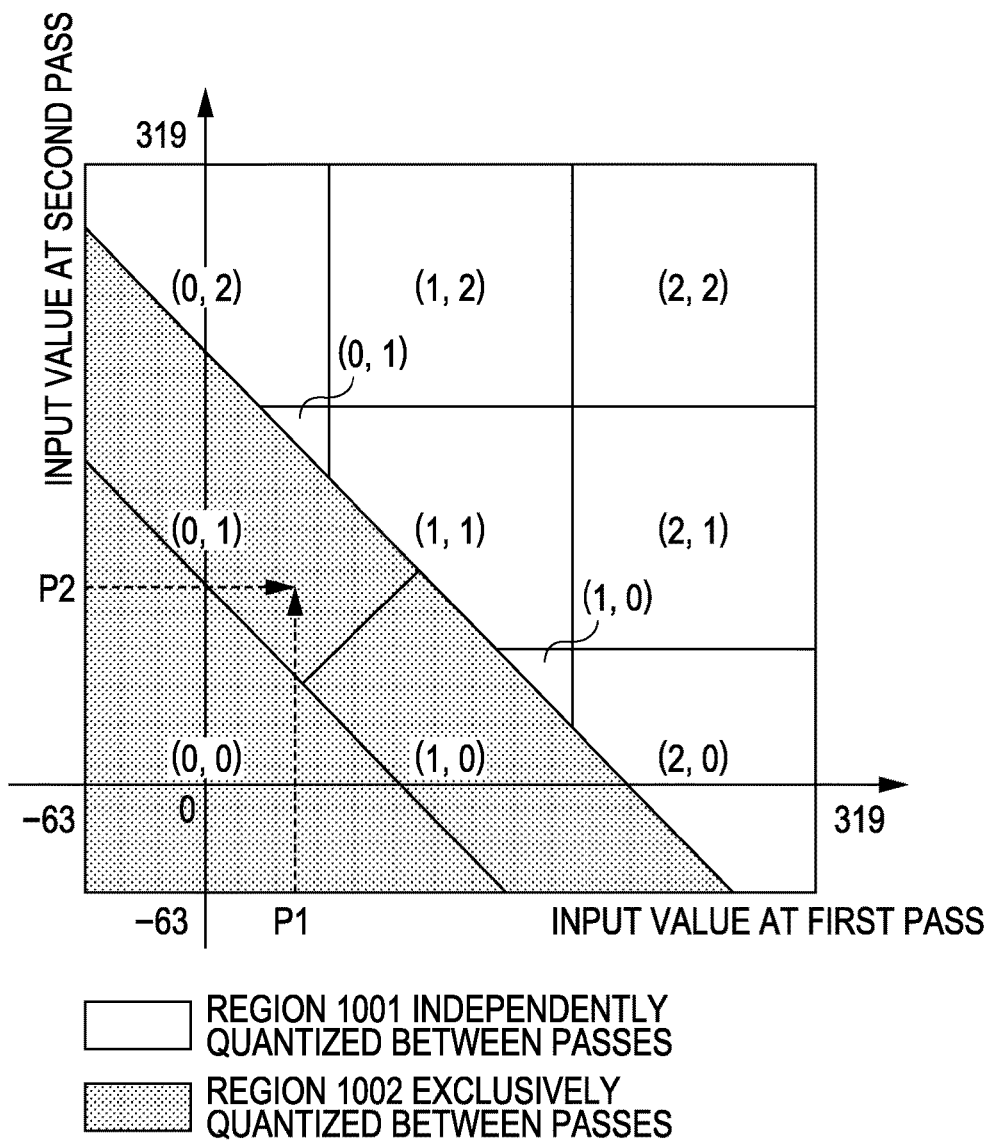
FIG. 10 illustrates a look up table used in the dot separation type error diffusion processing.

FIG. 9 is a flow chart for describing the dot separation type error diffusion processing in step S24 of FIG. 2 in detail. Also, FIG. 10 is a look up table for determining an output value from an input value used in the dot separation type error diffusion processing. It is noted that according to the present embodiment, the input value including the propagated error has a value from −63 to 319, and the output quantization level has a value from 0 to 2. The values in parentheses in the respective divided regions in the look up table represent the output values. It is noted that the input values and the quantization level are not limited to the above-described examples and may take other input value or quantization level.

First, the selected pixels of the two pass images are respectively set at a position (0, 0) (S91). Then, the pixel values of the selected pixels of the respective pass images (which will be hereinafter referred to as input value, and also this input value includes the propagated error) are obtained (S92). From the obtained two input values, the look up table shown in FIG. 10 is looked up to decide the output values (S93). For example, when the input value of the selected pixel of the first pass image is P1=40 and the input value of the selected pixel of the second pass image is P2=120, the output to the first pass is 0, and the output to the second pass is 1. an error generated on the basis of the decision of the output values on the respective pass images, and the error is propagated to a surrounding pixel similarly to the error diffusion in the related art (S94). This processing is repeatedly performed for all the pixels (S95 and S96).

The look up table of FIG. 10 includes a region 1001 independently quantized (high density) between the passes and a region 1002 exclusively quantized (low density) between the passes. As can be seen from the table, the output values are decided irrespective of the input values between the passes in the independently quantized region 1001, but the output values are changed in accordance with the input values between the passes in the exclusively processed region 1002. In this manner, in the region corresponding to the low density (the region 1001), a plurality of pass images are dealt with as if the images are regarded as one image, and the processing is performed so that the dots are mutually exclusive to generate the pass image. As a result, in the region corresponding to the low density, the dots are mutually exclusive, and it is thus possible to form the image in which the density unevenness is suppressed. Also, the propagated error varies, and the exclusively quantized region and the independently quantized region are alternately utilized between the passes. For this reason, the image quality is not degraded at a border between the two regions. It is noted that in order to further improve the image quality, a processing of adding noise or the like for varying the threshold used to perform quantization may be performed.

Subsequently, the above-described pass image obtained in the dot separation type error diffusion processing unit 209 is input to the print data conversion unit 203 to be appropriately converted into the print data (S25).

Then, the converted print data is sent to the inkjet printer 102 which is connected to the host computer 101. In the inkjet printer 102, when the print data is received, the print data is stored in a print buffer in the memory 112.

Figures 11, 12:
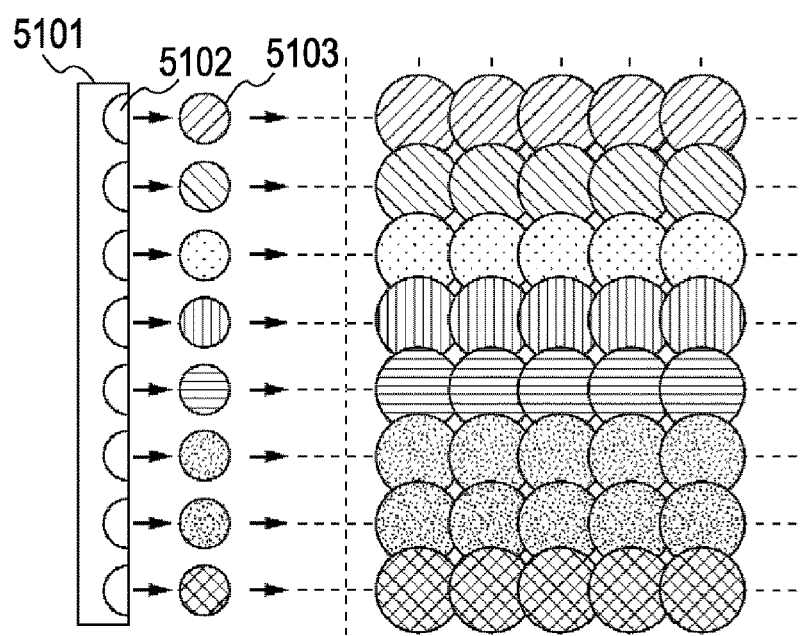
FIG. 11 is a table for deciding an arrangement of dots depending on a correspondence between a quantization level and a dot arrangement.
FIG. 12 illustrates an ideal multi-pass recording method, with a state in which ink droplets are ejected in a uniform direction with a uniform ejection amount.
Figure 13:
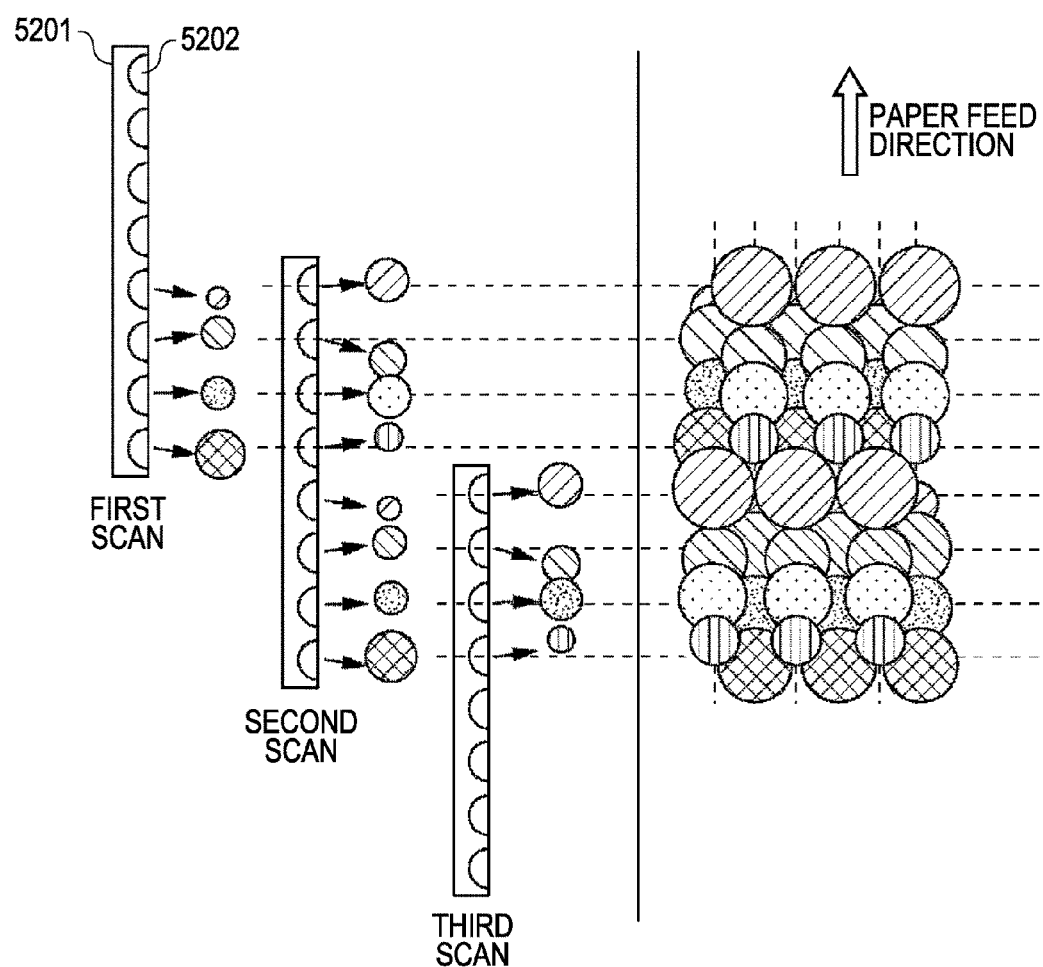
FIG. 13 illustrates a state in which through the multi-pass recording method, a main scan is performed by a recording head by plural times (three times), and a recording scan region having a unit of four pixels which are the half of eight pixels in the vertical direction is completed by performing the recording scan by two times (passes).

The image data stored in the print buffer is converted by the dot formation unit 204 into binary data between ON and OFF indicating whether the dot is ejected (S26). One pixel of the print image data received in the printer 102, that is, one pixel of the image before the dot formation is allocated with a region of 2×2, so that the quantization level is maintained also in the data after the dot formation. FIG. 11 illustrates an example of the dot formation, representing which kind of dot arrangement the respective quantization levels are converted into, and the arrangement of the dots is decided on the basis of this correspondence. It is noted that the above-described dot formation processing may not be necessarily performed when it is not necessary to convert the image data into ON or OFF in such a case, for example, where the image data is converted into the binary data in the quantization processing or where the diameter of the dot to be ejected can be changed to at least two types.

Figure 3:
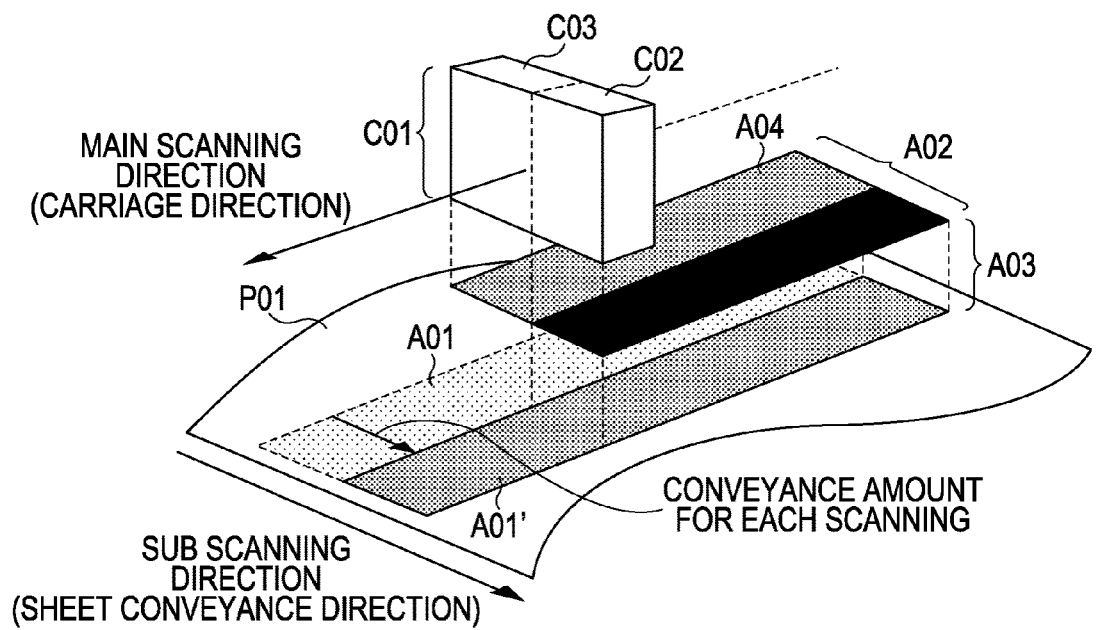
FIG. 3 is a schematic diagram of a print mechanism based on a multi-pass method, showing a state during the second scan.

After the dot arrangement is decided, the data is sent to the print unit 205, and the actual printing is started (S27). FIG. 3 is a schematic diagram of the print mechanism based on the multi-pass method, showing a state during the second scan. FIG. 3 illustrates a part to be printed on print paper P01 by using a recording head C01. The recording head C01 ejects ink while reciprocating in the main scanning direction to perform the image formation on the recording medium P01. Also, the sub scanning direction side of the recording head is set as a recording head front part C02, and the opposite side is set as a recording head rear part C03.

First, the first scan is carried out. According to the present embodiment, the two-pass print is performed. Thus, in the first scan, the print is performed for only ½ of the recording head length, and after the second scan, the print is performed for the recording head length. In the recording head, the data corresponding to the recording scan of the first pass image is sent to the rear part C03 which is equivalent to the half length of the recording head C01. The recording head C01 performs the recording scan in the main scanning direction to print the image in a first scan image formation area A01. After the first scan is ended, the print sheet is conveyed in the sub scanning direction by a sheet conveyance apparatus by the half length of the recording head C01. With the conveyance of the print sheet, the first scan image formation area A01 is shifted to A01'.

Then, the second scan is performed. In the recording head C01, the data corresponding to the recording scan of the second pass image is sent to the entire recording head. The recording head C01 performs the recording scan in the main scanning direction again, and the data corresponding to the recording scan of the second pass image is printed in a second scan image formation area A02. After the second scan is ended, the print sheet is conveyed in the sub scanning direction by the sheet conveyance apparatus by the half length of the recording head C01 again. Subsequently, in the third scan, the data corresponding to the recording scan of the first pass image is sent to the entire recording head. After the third scan, the data corresponding to the recording scan to be sent to the recording head is switched between the first pass image and the second pass image, and the recording scan similar to the second scan is repeatedly performed to continue to form the print image.

Figure 4:
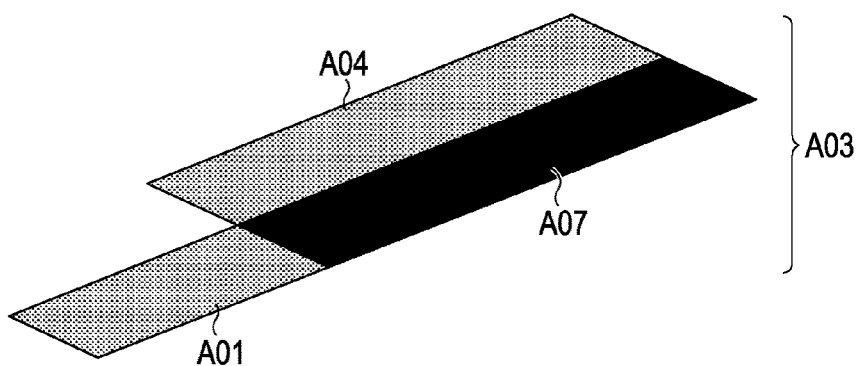
FIG. 4 illustrates an overlap of the first and second scan image formation areas of FIG. 3 on a recording medium.

It is noted that FIG. 4 illustrates a state of a first and second scan image formation area A03 on the paper. FIG. 4 illustrates a state during the second scan, showing a print state on the paper while the recording head is still on the middle part of the paper. A part where the recording scan is ended by two times corresponds to an image formation completion area. The image formation completion area A07 is an area where the first scan image formation area A01' and a second scan image formation area A04 are overstrung, that is, an area where the print for the two passes is completed.

According to the present embodiment, when the pass image is generated, the distribution ratio of the pixel value of the input image is periodically varied in accordance with the spatial positions for performing the distribution. By distributing the pixel value of the input image while the spatially periodical variation is added, the periodical variation appears in accordance with the spatial position on the entire pass. With this configuration, the variation is added to the input to the dot separation type error diffusion processing unit 209, and the interference of the dots between the passes caused when similar dot patterns are generated is suppressed. Also, at the time of printing, even when the misalignment between the passes is generated, an effect is provided that the density change is small. With these synergetic effects, the image is hardly degraded against the fluctuations in the ink droplets at the time of the image formation.

In addition, the present embodiment can be carried out by using a widely used general-purpose computer. Thus, it is not necessary to prepare a dedicated-use architecture, a special processing apparatus, and the like, and a significant feature is provided that the present embodiment is easily realized by using the general-purpose apparatus.

It is noted that in the dot separation type error diffusion processing unit 209 according to the present embodiment, the three-valued quantization method is used, but the method not limited to this. The binary quantization method may be used, and a higher-valued quantization method can of course be applied.

In addition, it is not necessary to use the dot separation type error diffusion processing according to the present embodiment. When the spatially periodic pixel value distribution is carried out, even in the quantization processing through a dither matrix method, it is possible to obtain a similar effect to that of the dot separation type error diffusion processing unit 209. For example, according to the present embodiment, in a case where the dither matrix method is used, by using the multi-value dither for performing the three-valued output, the respective passes are independently quantized.

It is noted that as described in the above, it is not necessary to perform the dot formation processing, but in a case where the dot formation processing is performed, different dot arrangement methods may be employed for each pass. For example, a method may be employed of performing such a processing that an arrangement shown in FIG. 11 is carried out for the first pass, and the dots are arranged at exclusive positions with respect to the arrangement shown in FIG. 11 for the second pass. In a case where the print data is generated by applying the embodiment of the present invention, unlike an exclusive mask method, the dot formation can be independently performed for the respective passes. For this reason, it is possible to use different dot arrangements between the passes at the time of the dot formation processing, and a more flexible dot arrangement can be performed. By devising the arrangement of the dots, it is possible to improve the print image quality.

In addition, the respective processings are performed in units of the image according to the present embodiment, but the configuration is not limited to the above. In a case where the memory consumption or the processing time is desired to be suppressed by reducing the number of reads from the buffer and writes, the processing may be performed in units of raster.

In addition, the inkjet printer functioning as the image forming apparatus according to the present embodiment is illustrated as an example, and the present embodiment can be of course applied to an apparatus for forming an image by performing a recording scan by plural times such as a laser printer.

As described above, according to the present embodiment, it is possible to suppress the density unevenness of the image formed through the multi-pass recording method.

Figure 17:
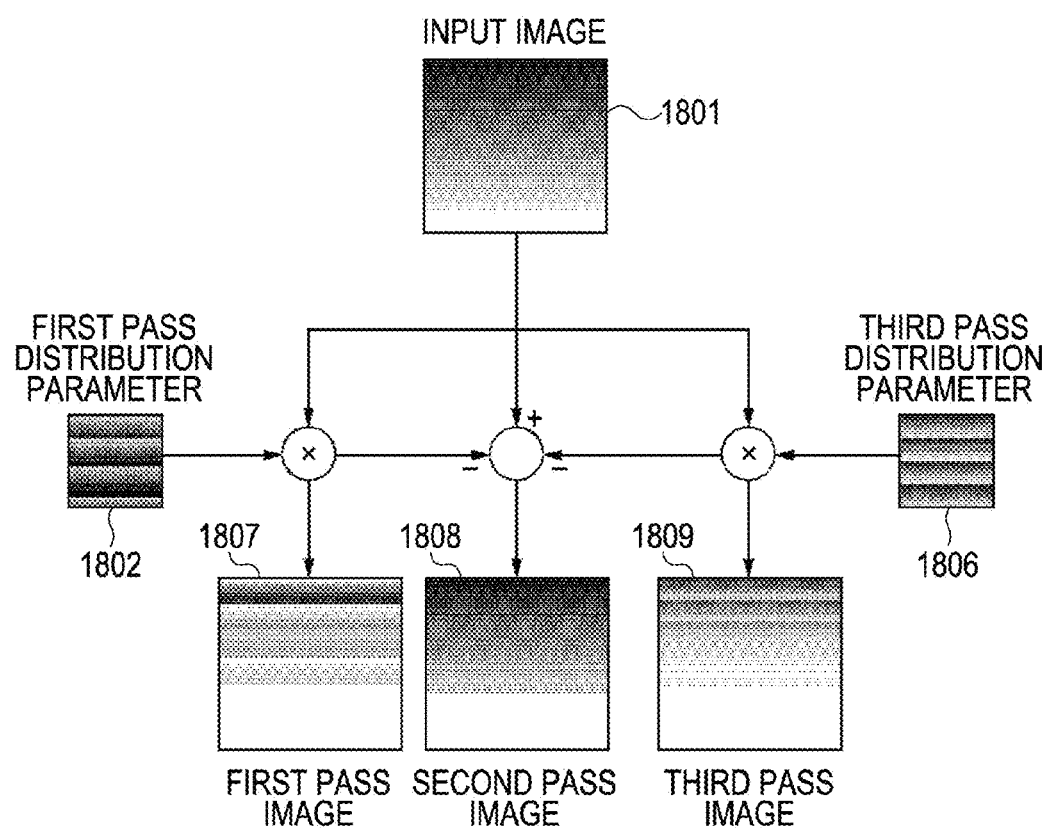
FIG. 17 illustrates an example of creating pass images for three passes by using a distribution parameter.

According to the first exemplary embodiment of the present invention, the example of using the two passes is described, but any passes whose number is equal to or more than two may be used. As an example, a case in which three-pass print is performed will be described. In the pass generation unit 208 according to the first exemplary embodiment of the present invention, in addition to the distribution parameter, another distribution parameter whose the phase of the waveform is shifted is prepared, and the pixel values are divided into three by using the two distribution parameters. FIG. 17 illustrates an example of data flow when the images for the three passes are created at the time of pass decomposition. An input image 1801, a first pass distribution parameter 1802, and a third pass distribution parameter 1806 are respectively input, and the distribution pixel values of the pass images are calculated on the basis of the following expressions to create a first pass image 1807, a second pass image 1808, and a third pass image 1809.

While setting the input value of the selected pixel as I (x, y), the first pass distribution parameter as P1 (x, y), the third pass distribution parameter as P3 (x, y), and the maximum parameter as Pmax, respectively, a first pass distribution pixel value D1 (x, y) and a second pass distribution pixel value D2 (x, y), a third pass distribution pixel value D3 (x, y) are calculated as follows.

$$D1(x, y) = I(x, y) * P1(x, y) / P\max$$

$$D3(x, y) = I(x, y) * P3(x, y) / P\max$$

$$D2(x, y) = I(x, y) - D1(x, y) - D3(x, y)$$

In addition, in the dot separation type error diffusion processing unit 209 of FIG. 5, by using the two-dimensional look up table shown in FIG. 10 expanded to the three dimensions, from the input values obtained from the three pass images, the table is looked up to decide the output values. After the dot separation type error diffusion processing is performed, the processings 203 to 205 are performed for the respective passes.

By performing the processings in the above-described manner, the embodiment can also be applied in the case of the three passes. Therefore, the embodiment can be applied to not only the two-pass print, but also to the multi-pass print such as the three-pass print and the four-pass print with the increased number of passes.

That is, the embodiment can be applied to the print with the high number of passes in addition to the print with the low number of passes.

According to the first exemplary embodiment of the present invention, the example has been described in which the similar processing is performed for the respective colors independently. It is noted that different processings can be performed for each of the colors. For example, in the printing based on CMYK, the first exemplary embodiment is applied to relatively distinguished colors such as CMK, and the method in the related art can be used for relatively undistinguished colors such as Y. In this way, for example, in a case where the image processing at a high speed is desired to be performed, as described above, the first exemplary embodiment is applied to the relatively distinguished colors, and the method in the related art is applied to the other colors. On the other hand, in a case where the high quality printing is desired to be performed, the first exemplary embodiment is applied to all the colors. In this way, the processing is performed with a flexible choice.

The pass generation unit 208 according to the first exemplary embodiment of the present invention does not need to use the distribution parameter, and the pixel value can be distributed through a numeric expression. For example, in a case where the distribution is to be performed in an environment where it is difficult to secure the buffer of the distribution parameter, the realization may be more suitable by using the numeric expression. As an example, in the two-pass print, in the case of using the numeric expression, a trigonometric function is used as in the following expression and the distribution rate may be changed periodically to be decomposed.

This expression represents a case of giving a variation only to the carriage direction. While setting the input value of the selected pixel as I (x, y), an amplitude as P, and a cycle as T, the first pass distribution pixel value D1 and the second pass distribution pixel value D2 are calculated as follows.

$$D1(x, y)=I(x, y)*P*(1+\sin(2\pi x/T))/2 \; D2(x, y)=I(x, y)-D1(x, y)$$

Figure 18:
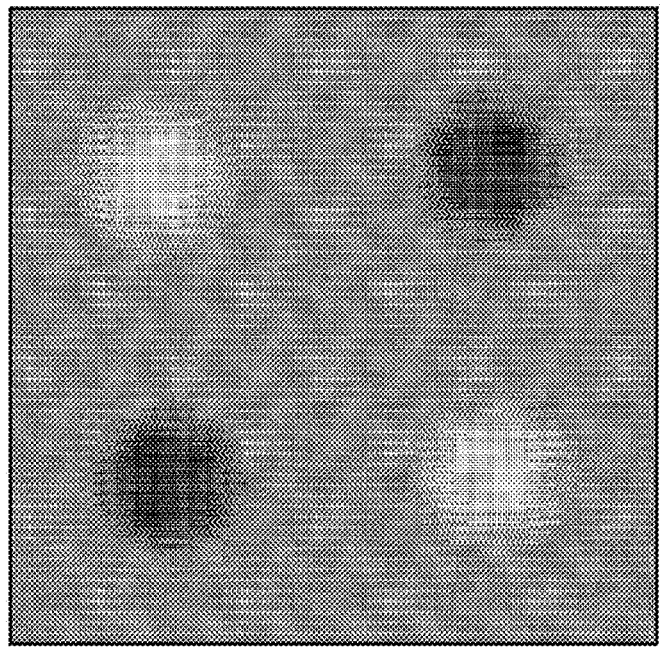
FIG. 18 illustrates an example of a circular symmetric distribution parameter.

In addition, as a direction of the spatial variation, the spatial variation is given in any one of the carriage direction and the sheet feed direction, in the diagonal direction, or in a circular symmetric manner as in FIG. 18, for example. Furthermore, a manner of giving the spatial variation is based on not only a method of simply giving the variation through a constant cycle but also a method of changing the cycle in accordance with a position, a method of combining a plurality of periodic variations, and the like.

Figure 19:
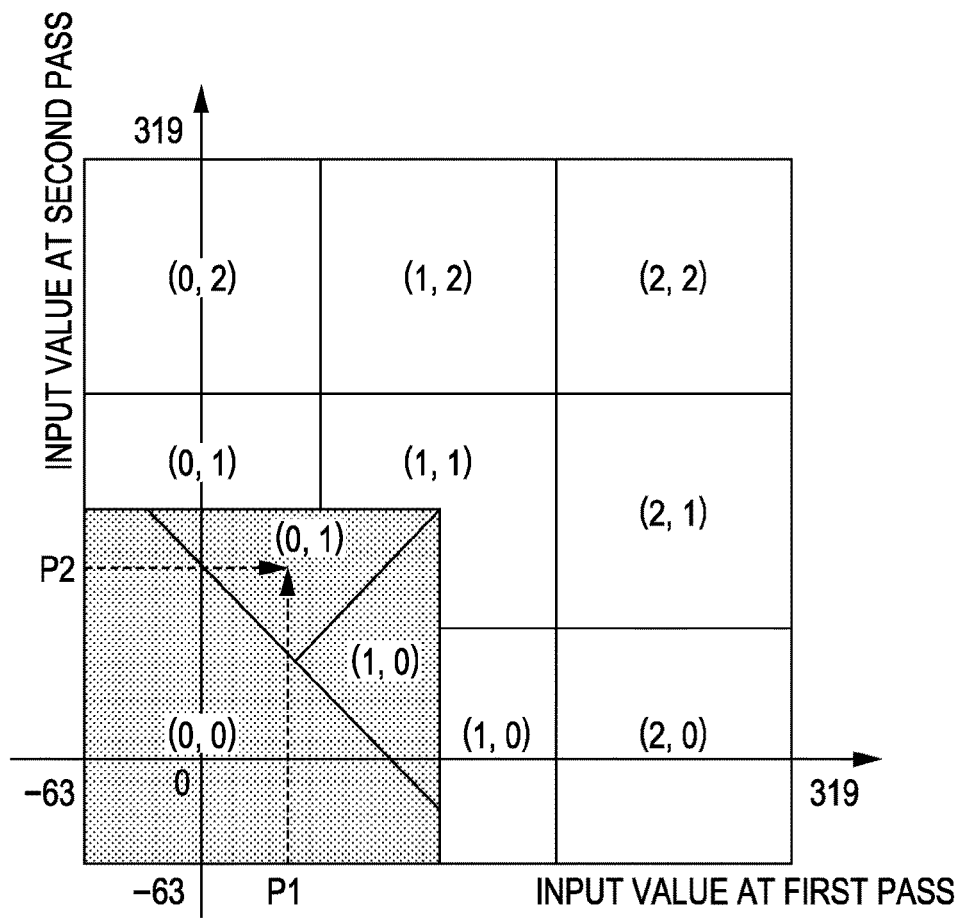
FIG. 19 illustrates an example of determining whether the pixel value after the look up table of FIG. 10 is distributed to the passes is equivalent to the low density.

According to the first exemplary embodiment of the present invention, the dot separation type error diffusion processing unit 209 of FIG. 5 uses a table in which the dot arrangement is exclusive in a case where the input pixel value before the distribution to the pass (a sum of the input values of the first pass and the second pass) is a value corresponding to the low density. However, in a case where the pixel value after the input density is distributed to the pass is a value corresponding to the low density, the table in which the dot arrangement is exclusive may be used. The embodiment can be realized by changing the parameter used in the dot separation type error diffusion processing unit 209 (for example, as in FIG. 19) to change the region 2901 where the error diffusion is independently performed and the region 2902 where the error diffusion is exclusively performed.

According to the first exemplary embodiment of the present invention, in the dot separation type error diffusion processing unit 209, the method of using the table is described. For example, in a case where it is difficult to hold the buffer for the table in an environment, a method other than the method of using the table may be needed in some cases. In this case, the embodiment may be realized through a numeric expression. For example, in the related art (for example, Japanese Patent Laid-Open No. 2000-354172), by comparing the input values between cyan and magenta, the outputs of cyan and magenta are decided. The application of this is applied between the passes, and the embodiment may be realized through the numeric expression. For example, while setting the input value of the first pass as P1 and the input value of the second pass as P2, the output may be decided through the following expression. T1, T2, S1, and S2 are thresholds, and O1 and O2 are outputs of the first pass and the second pass, respectively. It is noted that the following expression is merely an example of performing the output corresponding to the first exemplary embodiment of the present invention. In a case where possible values of the input value and the output value are different, the following expression is of course changed accordingly.

When $P1+P2 \leq T1$, $(O1, O2)=(0, 0)$

When $T1<P1+P2 \leq T2$, if $P2 \leq P1, (O1, O2)=(1, 0)$ otherwise, $(O1, O2)=(0, 1)$ When $T2<P1+P2$, regarding the respective inputs P (=P1, P2), if $P \leq S1, P=0$ if $S1<P \leq S2, P=1$ if $S2<P, P=2$ As an example in which specific thresholds are applied to the above-mentioned expressions, the following calculations may be carried out.

When $P1+P2 \leq 124$, $(O1, O2)=(0, 0)$

When $124<P1+P2 \leq 251$, if $P2<P1, (O1, O2)=(1, 0)$ otherwise, $(O1, O2)=(0, 1)$ When $251<P1+P2$, regarding the respective inputs P (=P1, P2), if $P \leq 64, P=0$ if $64<P \leq 191, P=1$ if $191<P, P=2$ The respective thresholds used in the above-described expressions are merely example of the present embodiment. For example, it is possible to adopt changed thresholds of the above-described expressions of course, and it is also possible to adopt a method of varying the thresholds during the error diffusion processing.

According to the fifth exemplary embodiment, the description has been provided of the case of using the buffer for the table in the dot separation type error diffusion processing unit 209 of FIG. 5. However, for example, in a case where it is difficult to hold using the buffer for the table in an environment, a method other than the method of using the table may be necessary in some cases. In this case, the embodiment may be realized by using a numeric expression. For example, while setting the input value of the first pass as P1 and the input value of the second pass as P2, the outputs may be decided through the following expressions. T1, T2, and S1 are the thresholds, and O1 and O2 are the outputs of the first pass and the second pass, respectively. It is noted that the following expressions are merely examples for performing the output corresponding to the first exemplary embodiment of the present invention. In a case where possible values of the input value and the output value are different, the following expression is of course changed accordingly.

Regarding the inputs P (=P1, P2), the following expressions are utilized.

If $P \leq T1$ when $P1+P2 \leq S1$, $(O1, O2)=(0, 0)$

When $S1<P1+P2$, if $P2 \leq P1, (O1, O2)=(1, 0)$ otherwise, $(O1, O2)=(0, 1)$

If $T1<P \leq T2, P=1$

If $T2<P, P=2$

An example of applying specific thresholds to the above-described expressions may be represented as follows. Regarding the inputs P (=P1, P2), the following expressions are utilized.

If $P \leqq 192$ when $P1+P2 \leqq 124$, $(O1, O2)=(0,0)$

When $124<P1+P2$, if $P2 \leqq P1, (O1, O2)=(1, 0)$ otherwise, $(O1, O2)=(0, 1)$ if $192<P \leqq 255, P=1$ if $255<P \leqq 319, P=2$ The respective thresholds used in the above-described expressions are merely example of the present embodiment. For example, it is possible to adopt changed thresholds of the above-described expressions of course, and it is also possible to adopt a method of varying the thresholds during the error diffusion processing.

In the dot separation type error diffusion processing unit 209 of FIG. 5 according to the first exemplary embodiment of the present invention, the embodiment is not necessarily limited to the case of using this error diffusion method. For example, parameters different between the passes used in the error diffusion such as parameters for determining the thresholds of the quantization used in the error diffusion or parameters for varying the thresholds may be used to realize the embodiment.

For example, a method of realizing the embodiment by using different values for the thresholds in the error diffusion will be described. A high threshold Th=170 and a low threshold Tl=85 are prepared, and Th is used for the threshold of the first pass, and Tl is used for the threshold of the second pass. In usual cases, these thresholds are used without changes to perform the error diffusion. While replacing the thresholds for each error diffusion of a certain region in a part corresponding to the low density, the error diffusion is performed.

In a case where the present embodiment is applied to generate the print data, after the pass generation is performed, the quantization processing is performed. Therefore, it is possible to use different parameters between at the time of the quantization processing, and more flexible setting of the parameters can be performed as compared with the method in the related art. That is, it is possible to apply more appropriate quantization parameters, and the print quality can be improved. In the quantization, in a case where the same parameter is used between the passes, if inputs having similar variations between the passes are assigned, a quantization result is obtained in which the dot patterns are similar between the passes. At this time, the dot patterns easily interfere with each other between the passes, which is a cause of the image quality degradation. In view of the above, when the different parameters between the passes are used in the quantization, even in a case where the inputs having similar variations between the passes are assigned, it is possible to obtain the quantization result in which the dot patterns are relatively different from each other. For this reason, the effect is obtained that the dot patterns hardly interfere with each other between the passes, which helps the improvement in the image quality.

The embodiment of the present invention can also be of course achieved through the following configuration. That is, a computer-readable storage medium on which a software program code having computer-executable instructions for realizing the above-described embodiments is recorded is supplied to a system or an apparatus, and the program code stored on the storage medium is read out and executed by a computer (or a CPU or an MPU) of the system or the apparatus. In this case, the program code itself read out from the storage medium realizes the functions of the above-described embodiments, and the storage medium on which the program code are stored constitutes the present invention.

As the storage medium for supplying the program code, for example, a flexible disk, a hard disk drive, an optical disk, an opto-magnetic disk, a CD-ROM, a CD-R, a magnet tape, a non-volatile memory card, a ROM, a DVD, or the like can be used.

In addition, the present invention of course includes not only a case where the program code read out by the computer is executed to realize the functions of the above-described embodiments but also a case where a part or all of the actual processes are performed by an operation system (OS) running on the computer in accordance with an instruction of the program code and the process realizes the functions of the above-described embodiments.

Furthermore, the present invention of course includes a case where the above-described embodiments are realized by the following processes. That is, the program code read out from the storage medium is written in a memory that is provided to a function expansion board inserted in the computer or a function expansion unit connected to the computer. After that, in accordance with an instruction of the program code, a CPU or the like provided to the function expansion board or the function expansion unit performs a part or all of the actual processes.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-091559 filed Mar. 31, 2008, which is hereby incorporated by reference herein in its entirety.

What is claimed is:

1. An image processing apparatus configured to generate recording data used in an image forming processing for carrying out an image formation by performing a recording scan by plural times on a same image region on a recording medium, the image processing apparatus comprising:
   a division unit configured to divide input image data into image data for each of the recording scans;
   a quantization unit configured to quantize, based on the divided image data for each of the recording scans, the image data for each of the recording scans; and
   a generation unit configured to generate, based on the quantized image data for each of the recording scans, recording data for each of the recording scans,
   wherein the division unit divides the input image data into the image data for each of the recording scans based on a division rate periodically varying in accordance with a spatial position of an image represented by the input image data.

2. The image processing apparatus according to claim 1, wherein the division rate includes a division rate periodically varying in a main scanning direction of a recording read of the image forming apparatus.

3. The image processing apparatus according to claim 1, wherein the division rate includes a division rate periodically varying in a sub scanning direction of a recording read of the image forming apparatus.

4. The image processing apparatus according to claim 1, wherein the division rate includes a division rate periodically varying in a main scanning direction and a sub scanning direction of a recording read of the image forming apparatus.

5. The image processing apparatus according to claim 1, wherein the division rate includes a division rate varying in any one of a moire manner and a circular symmetric manner.

6. The image processing apparatus according to claim 1, wherein the division rate includes a division rate varying at an arbitrary angle with respect to any one of a main scanning direction and a sub scanning direction of a recording head of the image forming apparatus.

7. The image processing apparatus according to claim 1, wherein the quantization unit performs the quantization based on an error diffusion processing.

8. The image processing apparatus according to claim 7, wherein the quantization unit performs the quantization based on the error diffusion processing of a dot separation type.

9. The image processing apparatus according to claim 1, wherein the quantization unit performs the quantization based on a dither matrix method.

10. The image processing apparatus according to claim 1, wherein the division unit performs the division on a part of color components among respective color components constructing the image data.

11. The image processing apparatus according to claim 1, wherein the division unit performs the division on all color components among respective color components constructing the image data.

12. An image processing method of generating recording data used in an image forming processing for carrying out an image formation by performing a recording scan by plural times on a same image region on a recording medium, the image processing method comprising:

dividing input image data into image data for each of the recording scans;

quantizing, based on the divided image data for each of the recording scans, the image data for each of the recording scans; and generating, based on the quantized image data for each of the recording scans, recording data for each of the recording scans, wherein the dividing step includes dividing the input image data into the image data for each of the recording scans based on a division rate periodically varying in accordance with a spatial position of an image represented by the input image data.

13. A non-transitory computer-readable storage medium storing a computer program having computer-executable instructions for causing a computer to execute the image processing method according to claim 12.

* * * * *